(12) United States Patent
Gopalan et al.

(10) Patent No.: US 7,702,811 B2
(45) Date of Patent: *Apr. 20, 2010

(54) METHOD AND APPARATUS FOR MARKING OF WEB PAGE PORTIONS FOR REVISITING THE MARKED PORTIONS

(75) Inventors: Prabhakar Gopalan, Austin, TX (US); Kanmani Nachimuthu, Austin, TX (US); Lakshmi Naga Jyothy Potluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

This patent is subject to a terminal disclaimer.

(21) Appl. No.: 10/427,130

(22) Filed: Apr. 30, 2003

(65) Prior Publication Data

US 2004/0221006 A1 Nov. 4, 2004

(51) Int. Cl.
*G06F 15/16* (2006.01)
(52) U.S. Cl. .................. 709/245; 709/217; 709/228; 709/246; 709/229; 709/227; 705/1; 705/26; 714/48; 714/57
(58) Field of Classification Search ............... 709/203, 709/245, 217, 228, 246, 229, 227; 715/528, 715/512, 530, 701, 501.1, 838, 762, 800, 715/529; 714/799, 48, 57; 341/76, 77; 705/26, 705/1; 711/118; 707/1, 10, 201
See application file for complete search history.

(56) References Cited

U.S. PATENT DOCUMENTS 6,031,836 A 2/2000 Haserodt .............. 370/389
6,219,818 B1 * 4/2001 Freivald et al. .............. 714/799
6,317,782 B1 11/2001 Himmel et al. .............. 709/218
6,374,359 B1 4/2002 Shrader et al. .............. 713/201
6,510,458 B1 1/2003 Berstis et al. ............... 709/219
6,701,350 B1 * 3/2004 Mitchell ...................... 709/217
6,961,895 B1 11/2005 Beran et al.
7,149,776 B1 * 12/2006 Roy et al. .................... 709/205
2002/0143853 A1 * 10/2002 Isaac et al. .................. 709/201
2003/0233372 A1 12/2003 Warner et al.
2006/0080598 A1 4/2006 Bargeron et al.

* cited by examiner

*Primary Examiner*—Ario Etienne
*Assistant Examiner*—Barbara N Burgess
(74) *Attorney, Agent, or Firm*—Yee & Associates, P.C.; William H. Steinberg

(57) ABSTRACT

A method and apparatus for marking Web pages for later revisiting the Web pages are provided. With the method and apparatus, data structures are provided in the Web site server for tracking information regarding the Web pages associated with the Web sites, users that have visited the Web site, what pages were visited by the users, and portions of the web pages that were marked by the users. This information is maintained by the Web site server so that, upon subsequent visits to the Web site server, the marked portions of the Web pages visited by the user may be identified for special processing by the Web browser of the client device being used to access the Web site. Such special processing may include conspicuously identifying the marked portions in a display of the Web browser, providing the ability to jump to marked portions of the Web pages, displaying only the marked portions of the Web pages, and the like.

8 Claims, 10 Drawing Sheets

| 410 | 412 | 414 | 416 |
|---|---|---|---|
| WEB PAGE NUMBER | WEB PAGE NAME | WEB PAGE DESCRIPTION | OTHER WEB PAGE INFORMATION |
| 1 | index.htm | HOME PAGE | ... |
| 2 | main.htm | MAIN CONTENT PAGE | ... |
| 3 | fun.htm | ACTIVITIES PAGE | ... |
| ⋮ | ⋮ | ⋮ | ⋮ |

WEB SITE PAGE INDEX TABLE DATA STRUCTURE

*FIG. 4A*

| 420 | 422 | 424 |
|---|---|---|
| ANCHOR NAME/NUMBER | ANCHOR DESCRIPTION | OTHER ANCHOR INFORMATION |
| 1 | EVENTS | ... |
| 2 | PHOTOS | ... |
| 3 | LOCATION | ... |
| ⋮ | ⋮ | ⋮ |

WEB PAGE TABLE DATA STRUCTURE
(ONE FOR EACH WEB PAGE IN THE PAGE TABLE INDEX)

*FIG. 4B*

| 430 | 432 | 434 |
|---|---|---|
| COOKIE | PAGES VISITED | OTHER COOKIE INFORMATION |
| 3245@one.com | 1,3 | ... |
| 5abcd@two.com | 1,5,6,7 | ... |
| jxcz3@bbi.com | 1,2,4 | ... |
| ⋮ | ⋮ | ⋮ |

COOKIE TABLE DATA STRUCTURE

*FIG. 4C*

| 440 | 442 | 444 | 446 |
|---|---|---|---|
| WEB PAGE NUMBER | COOKIE | ANCHORED SECTION MARKED | OTHER INFORMATION |
| 1 | 3245@one.com | 1,2 | ... |
| 1 | 5abcd@two.com | 4 | ... |
| 1 | jxcz3@bbi.com | 18,19 | ... |
| 2 | jxcz3@bbi.com | 1,9,12 | ... |
| 3 | 3245@one.com | 4,5,8 | ... |
| ⋮ | ⋮ | ⋮ | ⋮ |

WEB PAGE COOKIE RELATIONSHIP TABLE DATA STRUCTURE

METHOD AND APPARATUS FOR MARKING OF WEB PAGE PORTIONS FOR REVISITING THE MARKED PORTIONS

BACKGROUND OF THE INVENTION

1. Technical Field

The present invention is generally directed to a method and apparatus for marking portions of a web page so that those portions may be revisited at a later time.

2. Description of Related Art

With the increased usage of the Internet as a source of information, the number of Web pages present on the Internet has increase dramatically. The Internet has many hundreds of thousands of Web sites that may be visited by users of Web browser applications. Each of these Web sites may have a plurality of Web pages associated with them that may be visited by users of Web browsers.

When a user is searching for information on the Internet, the user may often visit a number of Web sites and a number of Web pages associated with these Web sites. Often, a user may desire to return to a Web page previously visited because a portion of the Web page may have been of interest to the user. However, the user must re-request the Web page and again attempt to locate the portions of the Web page that were of interest. With current Web browsers and Web sites there is no ability for a user to mark portions of a Web page and have those marked portions for revisiting the Web page. Thus, it would be beneficial to have an apparatus and method for marking portions of a Web page for later revisiting the Web page.

SUMMARY OF THE INVENTION

The present invention provides a method and apparatus for marking Web pages for later revisiting the web pages. More specifically, the present invention is directed to a mechanism for marking portions of a Web page so that those portions of the Web page may be conspicuously identified during subsequent visits to the Web page. In addition, other functions, such as immediately jumping to the marked portions, may be provided through a Web browser graphical user interface plugin.

With the method and apparatus of the present invention, data structures are provided in the Web site server for tracking information regarding the Web pages associated with the Web sites, users that have visited the Web site, what pages were visited by the users, and portions of the web pages that were marked by the users. This information is maintained by the Web site server so that, upon subsequent visits to the Web site server, the marked portions of the Web pages visited by the user may be identified for special processing by the Web browser of the client device being used to access the Web site. Such special processing may include conspicuously identifying the marked portions in a display of the Web browser, providing the ability to jump to marked portions of the Web pages, displaying only the marked portions of the Web pages, and the like.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A-4D are exemplary diagrams of data structures maintained by a server in accordance with the present invention;

FIG. 5 is an exemplary diagram illustrating a data flow for identifying marked portions of a Web page using the data structures of FIGS. 4A-4D;

DETAILED DESCRIPTION OF THE PREFERRED EMBODIMENT

The present invention provides an apparatus and method for marking portions of Web pages for subsequent revisits to the Web pages. Since the present invention is directed to the marking of Internet Web pages, the present invention is best suited for a distributed data processing environment, such as the Internet. Therefore, in order to provide a context in which the present invention may be implemented, the following description of a distributed computing environment is provided.

Figure 1:
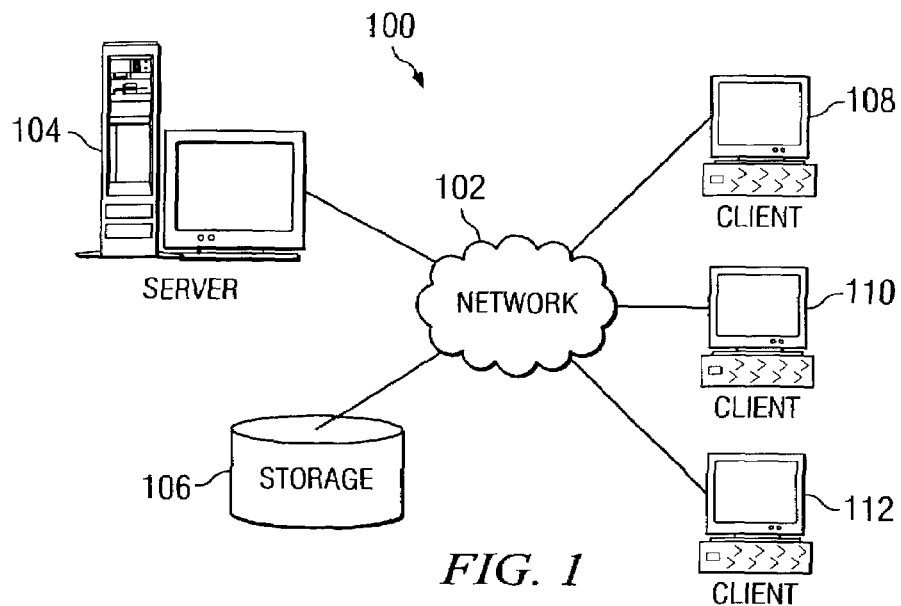
FIG. 1 is an exemplary diagram illustrating a distributed computing system in which the instant messaging system according to the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
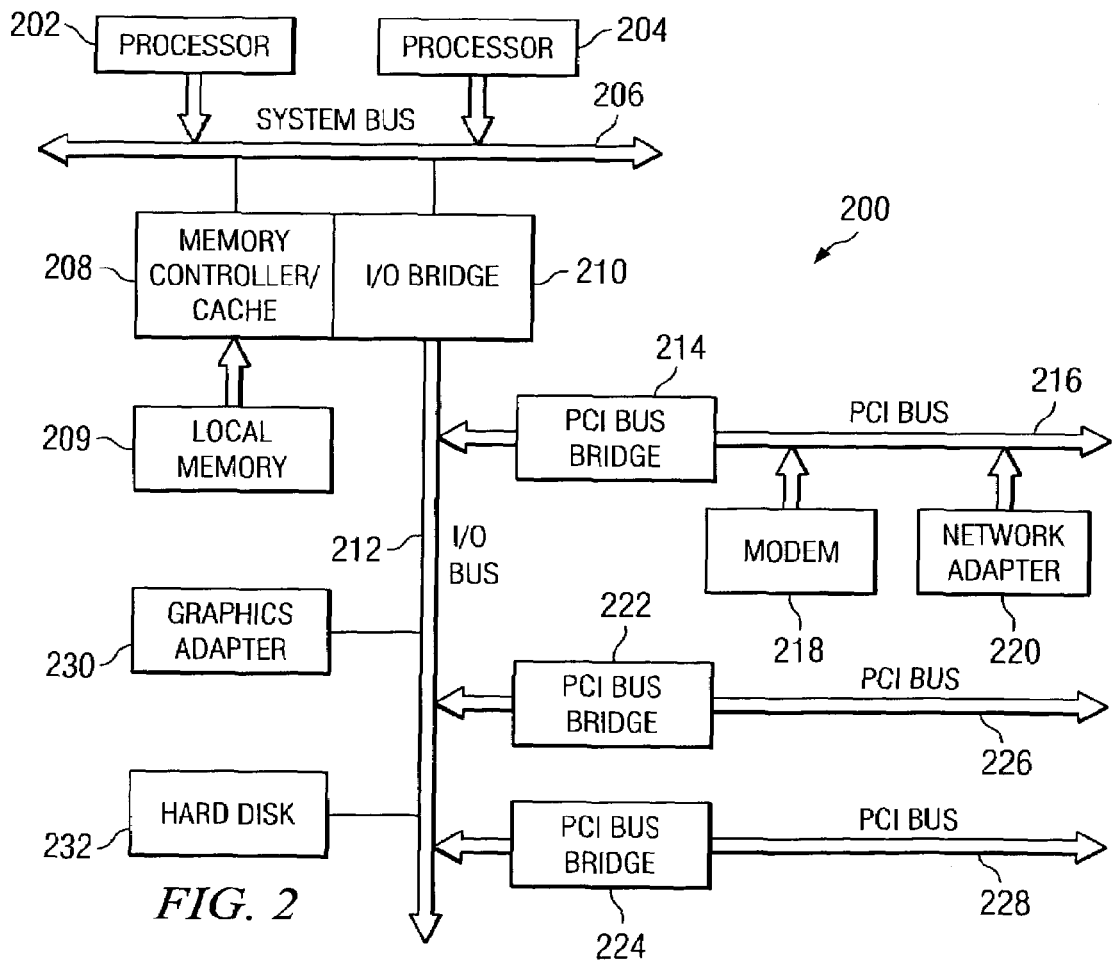
FIG. 2 is an exemplary block diagram of a server apparatus that may be used as an instant messaging server in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
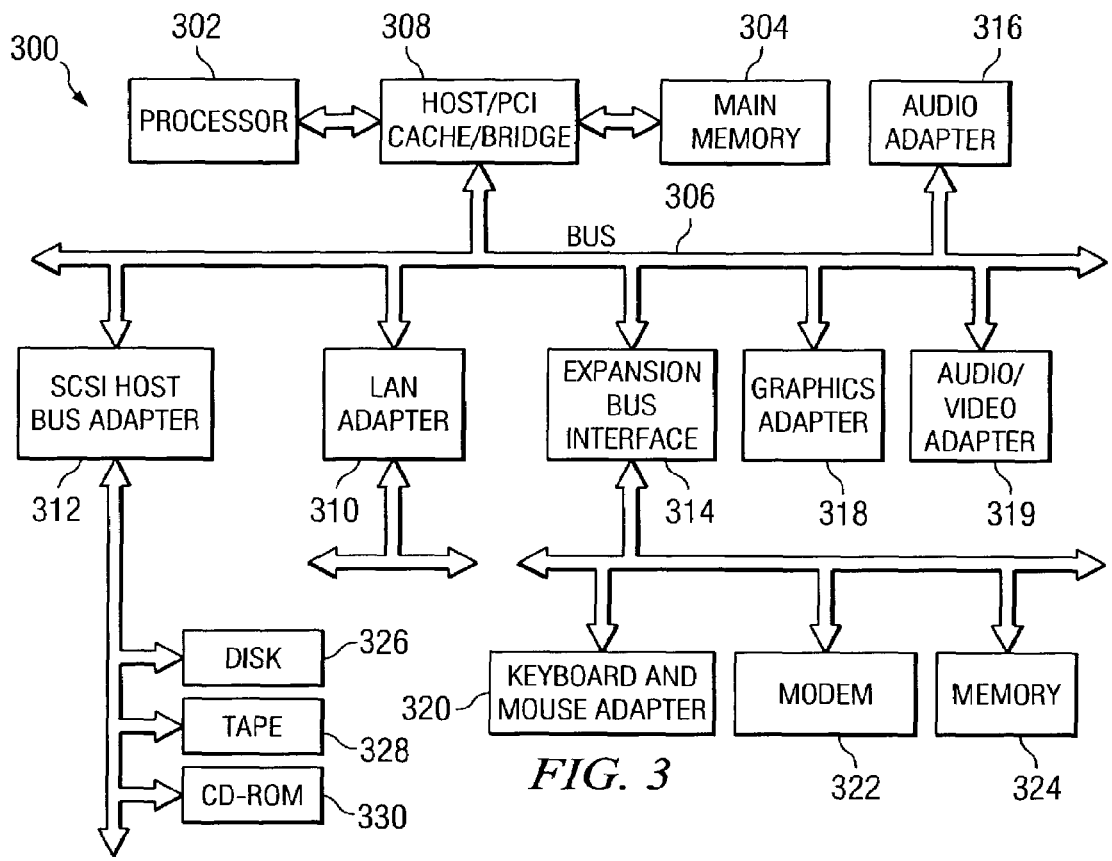
FIG. 3 is an exemplary block diagram of a client device that may be used as an instant messaging client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a mechanism for marking portions of a Web page for use with later visits to the Web page. With the present invention, a user may mark a portion of a Web page using a graphical user interface of a Web browser application on the user's client device to select the portion of the Web page. In response, the server of the Web site associated with the Web page stores information in one or more data structures identifying the client device (and thus, the user), the Web pages visited, i.e. requested, by the client device, the portions of the Web pages marked by the client device, and the like. This information may then be used in subsequent requests for the Web page to thereby perform special processing of the marked portions of the Web page.

In view of the above, the present invention requires a mechanism for uniquely identifying a client device/user and a mechanism for identifying portions of a Web page. With a preferred embodiment of the present invention, cookies are used as a mechanism for uniquely identifying a client device/ user and anchor tags in the code of the Web page are used as a mechanism for identifying portions of a Web page.

Although cookies are used to identify a user uniquely in the preferred embodiments, the present invention is not limited to such and any known user authentication mechanism may be used without departing from the spirit and scope of the present invention. For example, a password-type mechanism or light weight directory access protocol type mechanism may be used to identify users or client devices uniquely. In addition, while the preferred embodiments of the present invention make use of anchor tags as a mechanism for identifying portions of a Web page, the present invention is not limited to such. Any tag or other delimiting type of mechanism for identifying portions of a Web page may be used without departing from the spirit and scope of the present invention.

With the present invention, when a client device visits a Web site, the web site generates a cookie for the client device. As is generally known in the art, a cookie is a randomly generated string of letters and/or digits, that a Web site uses to identify a user or client device and the user's set of preferences uniquely. The cookie is stored on the client device and the Web site server. When a request is received from a client device for a Web page of the Web site, the server queries the client device for the cookie. If the client device transmits a cookie corresponding to the Web site, the server may identify the client device and its set of preferences. The present invention, in a preferred embodiment, makes use of cookies to identify a client device and its associated marked portions of Web pages, as described hereafter.

Anchor tags are format codes inserted into the code of a Web page. The present invention, in a preferred embodiment, makes use of anchor tags to identify portions of a Web page. When a user selects a portion of the Web page for marking of the portion of the Web page, an identifier of the tags for the selected portion of the Web page is stored in a data structure in the Web site server. The identifiers of the tags for the selected portions of the Web page stored in the data structure are later used in subsequent requests for the Web page to thereby identify the marked portions for special processing by the Web browser of the client device.

Figures 4D, 5:
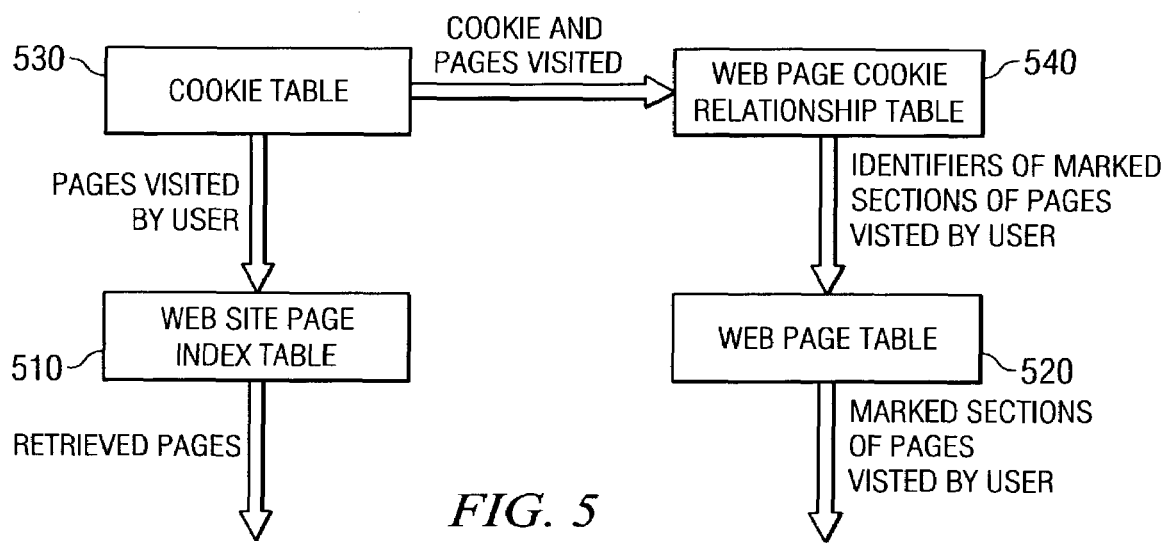

As mentioned above, the present invention, in a preferred embodiment, makes use of one or more data structures for maintaining information about the Web pages of a Web site, the client devices or users that visit, or request, the Web pages, and the portions of the Web pages marked by the users of the client devices. FIGS. 4A-4D illustrate exemplary data structures that may be maintained by a Web site server in accordance with the present invention. FIG. 4A is an exemplary diagram of a Web site page index data structure. FIG. 4B is an exemplary diagram of a Web page data structure. FIG. 4C is an exemplary diagram of a cookie data structure. FIG. 4D is an exemplary diagram of a Web page cookie relationship data structure.

Referring to FIG. 4A, the Web site page index table data structure has records that contain a Web page number reference 410, a Web page name 412, a Web page description 414, and other Web page information 416. The Web page number reference 410 is a unique identifier for identifying a particular Web page from the plurality of Web pages associated with a Web site. If the Web page name is unique, the Web page name may be used instead of the Web page number reference. The Web page name 412 is the filename of the Web page. The Web page description 414 is an administrator prepared description of the web page for use by the administrator in further identifying the Web page. The other Web page information 416 may include any other Web page information that is beneficial to maintain in a data structure such as the Web site page index table data structure. Such other information may include, for example, size of the Web page, version of the Web page, number of hits on the Web page, webmaster contact information, number of tags in the Web page, the meta-tags of the Web page, and the like.

Each Web page in the Web site is catalogued using this Web site page index table data structure and thus, has a record in the Web site page index table data structure. When a new page is created for the Web site and published by making it available via the Web site server, a new record is created in the Web site page index table data structure identifying the new Web page's number reference, Web page name, Web page description, and other Web page information. When an old Web page is removed from the Web site, the corresponding record in the Web page index table data structure is deleted.

FIG. 4B is an exemplary diagram of a Web page table data structure. Each Web page identified in the Web site index table data structure of FIG. 4A will have an associated Web page table data structure similar to that shown in FIG. 4B. Thus, while there may be a single Web site index table data structure for a Web site, there may be a plurality of Web page table data structures for the Web site, one for each Web page of the Web site.

As shown in FIG. 4B, the Web page table data structure includes records having an anchor tag name/number 420, an anchor tag description 422, and other anchor tag information 424. Each anchor tag in the Web page will have a corresponding record in the Web page table data structure.

As a Web page is added to a Web site, a record for the Web page is added to the Web site index table data structure of FIG. 4A. In addition, a Web page table data structure is created for the Web page and is populated with records for each of the anchor tags in the Web page. If new content is added to the Web page, then the added sections of the Web page are identified by the sections' corresponding anchor tags and records for these new sections of the Web page are added to the Web page table data structure. If content is removed from the Web page, the corresponding record(s) in the Web page table data structure, as identified by the anchor tags associated with the removed sections, are deleted from the Web page table data structure.

The creation of the Web site index table data structure of FIG. 4A, the Web page table data structure of FIG. 4B, and records within these data structures, may be performed by a human administrator of the Web site server for example. Alternatively an automated system may be utilized for creating these data structures and their records. In such an automated system, as Web page files are deployed in a Web site server, or removed from the Web site server, or as portions of a Web page are added or removed, the automated system may parse the Web page files to identify the name of the Web page (such as the filename of the Web page file), a description of the Web page (such as from comments inserted in the Web page file), the anchor tags in the Web page file, and a corresponding description of the anchor tag (such as based on parameters associated with the anchor tag). Such an automated system may include, for example, a Web page file parser, a data structure record generation module, and a data storage device.

In addition to the Web site index table data structure of FIG. 4A and the Web page table data structure of FIG. 4B, other data structures for associating client devices and/or users with Web pages requested by the client device/user and portions of the Web pages marked by the client device/user are maintained by the Web site server. These additional data structures are generated and populated in response to requests from client devices, as described hereafter.

FIG. 4C is an exemplary diagram illustrating a cookie table data structure in accordance with the present invention. When a client device first logs onto the Web site server by, for example, entering a Universal Resource Locator (URL) for the Web site into a Web browser application on the client device, the Web site server generates a cookie for the client device. This cookie is stored both on the client device and in the cookie table data structure shown in FIG. 4C.

In addition to creating the cookie 430 for the client device and storing the cookie 430 in the cookie table data structure, the present invention monitors the Web pages of the Web site that are requested by the client device. Identifiers 432 for these Web pages requested by the client device are stored in association with the cookie 430 in the cookie table data structure of FIG. 4C. Thus, the cookie table data structure uniquely identifies which Web pages of the Web site have been previously visited, i.e. requested, by the client device having the unique cookie identifier.

As a further function of the present invention, the Web site server monitors for requests from the client device to mark portions of Web pages retrieved by the client device. The Web browser application of the client device is enhanced by the present invention to include a functionality for allowing a user to select a mark up operation and to select a portion of the Web page that is to be marked. Such functionality may be provided through a plugin module to the Web browser application. This plugin module may have a corresponding virtual button, menu item, or the like, that may be selected by the user of the Web browser using a graphical user interface to thereby invoke the operation of the plugin module.

For example, the user of the Web browser may highlight a portion of the Web page by placing a cursor at the beginning of the portion using a pointing device, and then clicking and dragging the pointing device to thereby highlight the portion of the Web page. The user may then either select an option from a pull down menu, select a virtual button in a toolbar of the graphical user interface, select an option from a menu generated by a "right click" of the mouse button, or the like, that causes the highlighted portion to be marked.

In response to receiving the input from the user to mark the selected portion of the Web site, the Web browser of the client device may transmit a request to the Web site server that the selected portion be marked in association with the client device. Such a request may include, for example, a designation of the Web page, the cookie for the client device, and identifiers of the anchor tags for the selected portions of the Web page that are to be marked.

In response to receiving the request to mark the selected portion, the web site server generates a record in a Web page cookie relationship table data structure corresponding to the Web page and the cookie identified in the received request. An example of this Web page cookie relationship table data structure is provided in FIG. 4D. This data structure may later be used in subsequent requests for the Web page to identify the portions of the Web page marked by the user for special processing.

As shown in FIG. 4D, the web page cookie relationship table data structure (hereafter referred to as the "relationship" table data structure) includes records for each combination of Web page and cookie. Each record in the relationship table data structure includes a Web page number 440, a cookie 442, a list of anchor tag identifiers for marked portions of the Web page 444, and other information 446. When a client device first requests a Web page and then sends a request to mark portions of the Web page, a record is created in this relationship table data structure. As the client device sends additional requests to mark portions of this Web page, additional anchor tag identifiers are added to the list of anchor tag identifiers 444. When the same client device sends additional mark requests to the Web site server for other Web pages, additional records are added to the relationship table data structure. When a different client device sends a request to mark a portion of the Web page, another record is generated in the relationship table data structure for the particular cookie and Web page. In this way, the Web site server is able to keep track of which portions of Web page content have been marked by each unique client device for later special processing during subsequent requests for the Web page content.

FIG. 5 is an exemplary diagram illustrating a data flow for identifying marked portions of a Web page using the data structures of FIGS. 4A-4D. As shown in FIG. 5, when a client device sends a request for a Web page to the Web server, the Web site server may request that the client device transmit a cookie, if the client device has one, for this Web site. This cookie may then be used with the cookie table 530 to identify previously visited, i.e. requested, Web pages associated with the Web site. The combination of the cookie and the Web pages previously visited by the client device may be provided to the Web page cookie relationship table 540 to retrieve records for each combination of cookie and Web page identifier. These Web page identifiers may also be provided to the Web site page index table 510 to thereby identify the names of the Web pages for retrieval.

Using the web page cookie relationship table 540, the portions of the Web pages previously visited by the client device and marked by the client device may be identified. The identifiers of the anchor tags for these portions of the Web pages may be provided to the Web page table 520 in order to identify the specific portions of the Web page that are to receive special processing in subsequent visits by the client device.

As a result, when the client device sends a request for one of these Web pages that have marked portions, the code for the Web page may be modified before sending to the client device so that the plugin module of the present invention in the Web browser application of the client device performs special processing of these marked portions of the Web page. For example, in a preferred embodiment, identifiers of the marked portions of the Web page are added to a header of the Web page HTML code so that, as the Web browser renders the Web page on the client device, the plugin module will identify those portions that have been marked as identified in the header, and perform special processing of those portions.

The special processing referred to herein may take many different forms. In a preferred embodiment, the special processing includes conspicuously identifying the marked portions in a display of the Web page on the client device. This may involve, for example, highlighting the marked portions, using a different text color, using a different text font type or size, or the like. Other special processing may include, for example, displaying only the marked portions, using speech synthesis (if available) to read marked portions of text to the user, jumping to marked portions of the Web page in response to an input from the user via the client device, and the like. For purposes of the present description, it will be assumed that the special processing is highlighting of the marked portions of the Web page. However, those of ordinary skill in the art will readily understand in view of the present description, that other special processing may be utilized without departing from the spirit and scope of the present invention.

Thus, the present invention provides a mechanism for marking portions of a Web page for special processing during subsequent visits to that Web page by the same user or client device. In this way, a user may mark portions of a Web page that are of interest so that the user may easily revisit those specific portions later during the same or a different Internet session. The present invention reduces the amount of time required to look up information in Web pages that have already been visited.

In addition, Web site providers may query the data structures maintained by the present invention to not only identify which Web pages of the Web site are most frequently visited, but also which portions of the Web pages are marked for special processing during revisits. This may allow Web site providers to determine how to better arrange their Web sites and Web pages as well as optimum placement of advertisements and the like.

Figure 6:
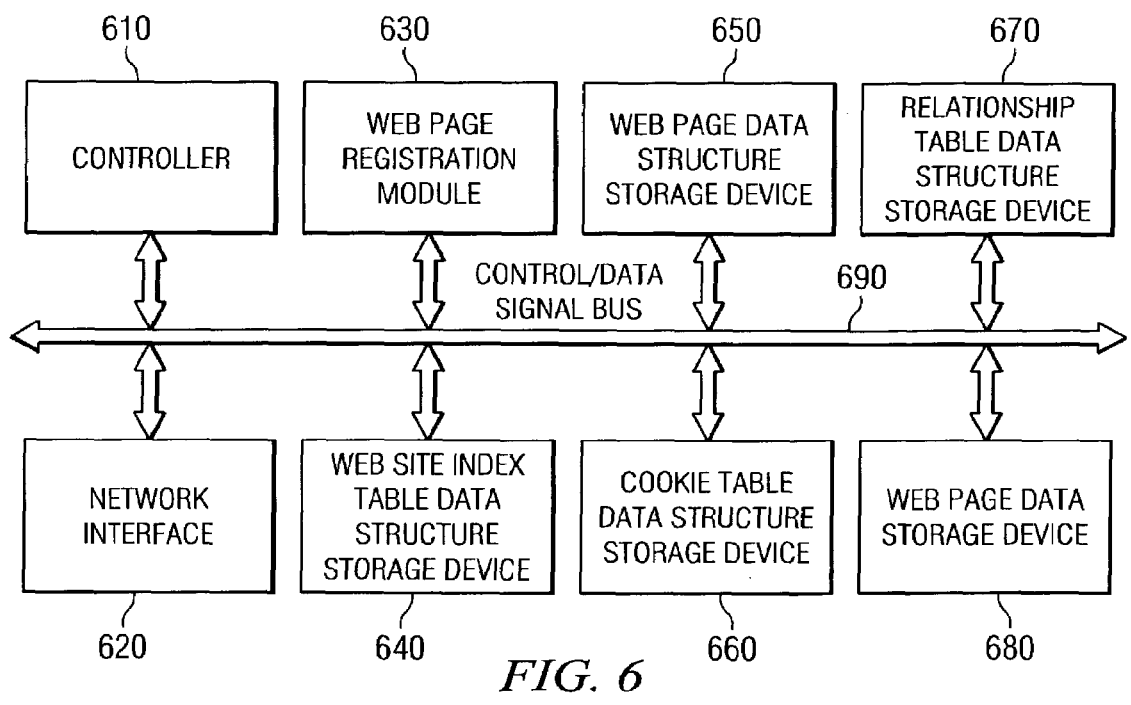
FIG. 6 is an exemplary block diagram of the primary operational components of a Web page marking mechanism according to the present invention.

FIG. 6 is an exemplary block diagram of the primary operational components of a Web page marking mechanism according to the present invention. As shown in FIG. 6, the Web page marking mechanism includes a controller 610, a network interface 620, a Web page registration module 630, a Web site index table data structure storage device 640, a Web page data structure storage device 650, a cookie table data structure storage device 660, a relationship table data structure storage device 670, and a Web page data storage device 680. These elements are in communication with one another via the control/data signal bus 690. The elements shown in FIG. 6 may be implemented in hardware, software or any combination of hardware and software. In addition, while a bus architecture is shown in FIG. 6, the present invention is not limited to such and any architecture that facilitates the communication of control and data information between the elements of FIG. 6 may be used without departing from the spirit and scope of the present invention.

The controller 610 controls the overall operation of the Web page marking mechanism and orchestrates the operation of the other elements 620-680. The network interface 620 provides a communication connection with the data network, e.g., the Internet. The controller 610 receives requests from client devices via the network interface 620 and also sends Web page data to the client devices via the network interface 620.

The Web page registration module 630 performs the functions of registering Web pages and de-registering Web pages in the data structures maintained by the present invention. The Web page registration module 630 may include mechanisms for parsing Web pages to identify, for example, the filename of the Web page, the anchor tags in the Web page, and the like, as discussed previously. In addition, the Web page registration module 630 may instruct the Web site index table data structure storage device 640 and the Web page data structure storage device 650 to create new entries. Moreover, the Web page registration module 630 may instruct these devices 640 and 650 to remove entries when a Web page is no longer utilized in the Web site.

The Web site index table data structure storage device 640, the Web page data structure storage device 650, the cookie table data structure storage device 660, and the relationship table data structure storage device 670 all store their respective data structures as illustrated in FIGS. 4A-4D above. In addition, these elements may include logic and/or mechanisms for creating entries in these data structures, querying these data structures, and deleting entries from these data structures. The Web page data storage device 680 stores the actual data of the Web pages associated with the Web site.

When a Web page is deployed in the Web site via the Web page data storage device 680, the Web page registration module 630 registers the Web page with the Web site index table data structure storage device 640 and the Web page data structure storage device 650. Similarly, when a Web page is removed from the Web site, the Web page registration module 630 deletes the corresponding entries from the storage devices 640 and 650.

When a user first visits the Web site, the controller 610 generates a cookie for the user's client device and stores the cookie in the cookie table data structure storage device 660. The controller 610 then monitors which Web pages are requested by the client device and stores an identifier of each Web page requested in the cookie table data structure storage device 660 in association with the cookie.

When a user marks a portion of a Web page, the controller 610 receives the mark request and instructs the relationship table data structure storage device 670 to create an entry for the combination of the cookie for the user's client device and the Web page indicating the portions marked by the user. When the user revisits the Web site, the controller 610 identifies the user's client device cookie, looks up the Web pages previously visited by the user in the cookie table data structure storage device 660 and the marked portions of these Web pages in the relationship table data structure storage device 670. Based on the information in the Web site index table data structure storage device 640 and the Web page data structure storage device 650, the controller 610 retrieves these pages from the Web page data storage device 680 when requested and modifies the code for these Web pages to identify the marked portions of the Web pages. For example, when the Web page is requested, the header of the Web page code may be modified to identify the marked portions of the Web page.

At the client device, a plugin module is installed in the Web browser application. When a Web page is received by the Web browser, this plugin module determines whether marked portions of the Web page are identified in the code of the Web page, e.g., in the header of the Web page. If so, the plugin module performs special processing on those portions identified by the code of the Web page as being marked. The particular special processing performed may be based on preferences set by a user of the client device, for example. That is, the user may select that marked portions of Web pages be highlighted, displayed in a different color, displayed in a different font type and/or size, and the like. Similarly, a user may select that only marked portions of the Web page be displayed, that marked portions of the Web page be read using a speech synthesis application, or that a jump function be provided for jumping from one marked portion to another.

In a preferred embodiment, the special processing is performed based on anchor tags in the code of the Web page. That is, the header of the Web page will include the identifiers of the anchor tags associated with the marked portions of the Web page. The plugin module parses the Web page code to identify the corresponding anchor tags in the code of the Web page that match those identified in the header. The portions of the Web page associated with these tags are then processed in accordance with the user's preferences.

Figure 7A:
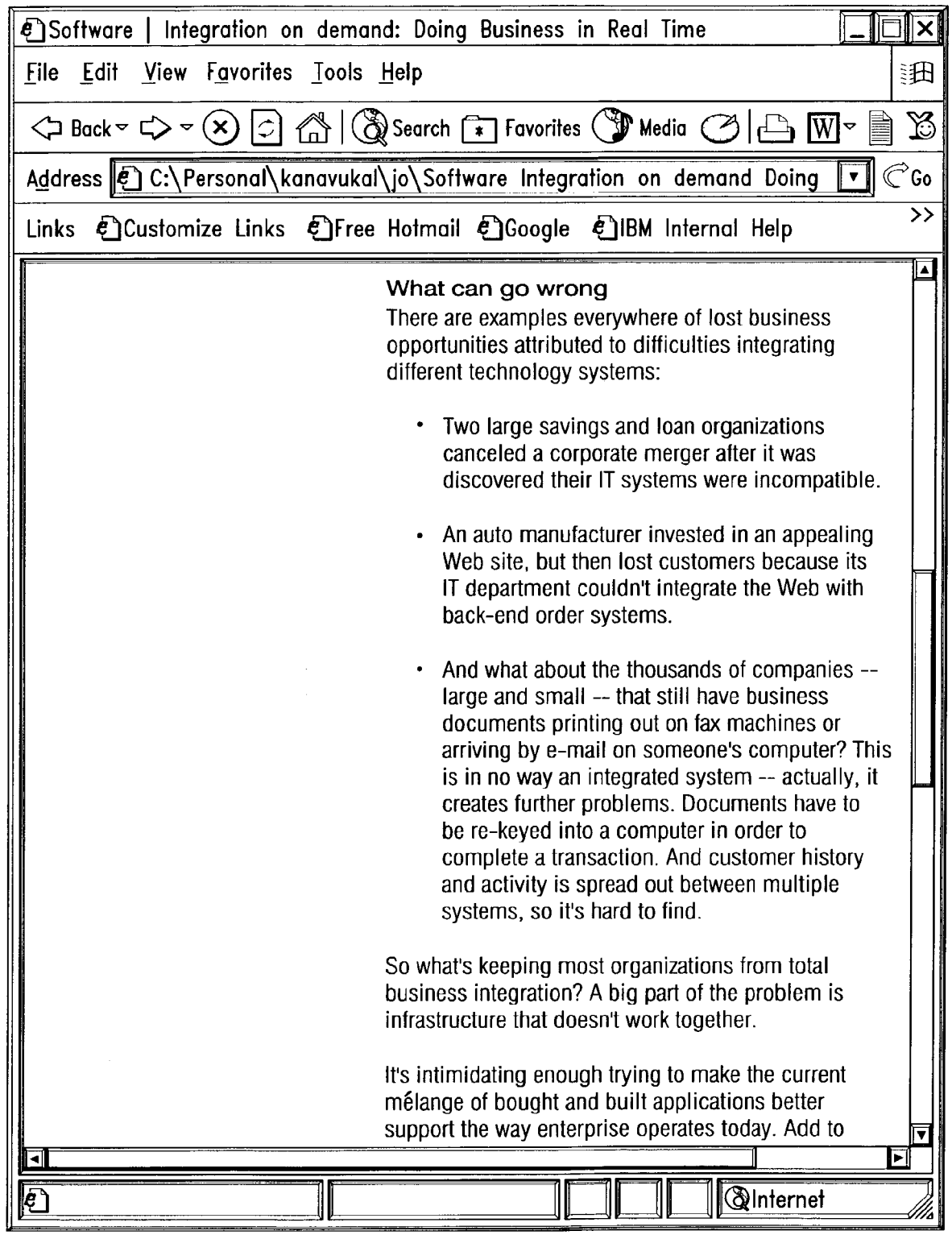
FIGS. 7A-7B are exemplary diagrams illustrating a graphical user interface of a Web browser plugin for marking portions of a Web page in accordance with the present invention.
Figure 7B:
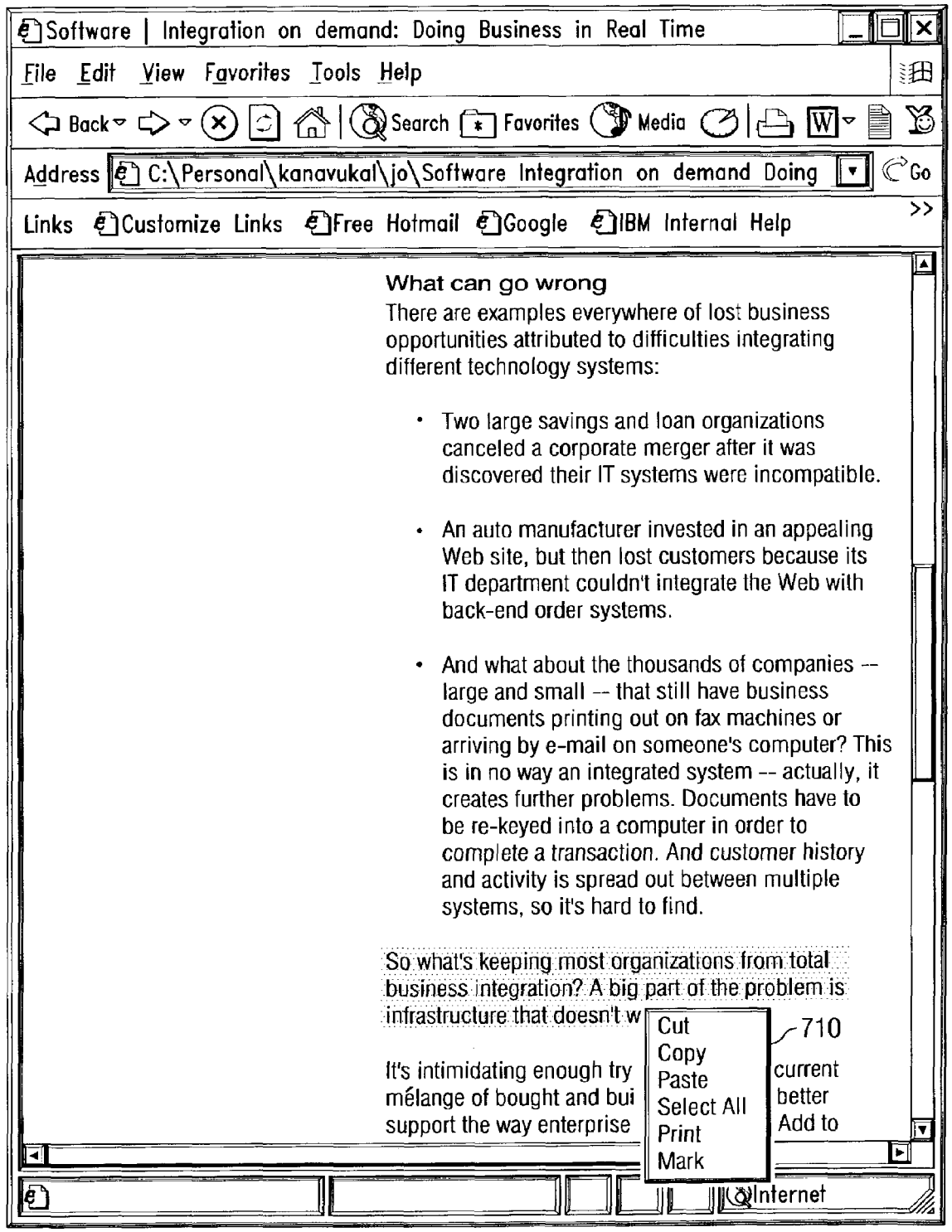

FIGS. 7A-7B are exemplary diagrams illustrating a graphical user interface of a Web browser plugin module for marking portions of a Web page in accordance with the present invention. FIG. 7A illustrates a standard display of a Web page using a Web browser application on a client device.

FIG. 7B illustrates a graphical user interface of a Web browser plugin module according to the present invention. As shown in FIG. 7B, a user may highlight the portion of the Web page that is to be marked by selecting a beginning of the portion by pressing a mouse button and then dragging the mouse cursor across the portion of interest. The user may then use a right click operation to display the pop-up menu 710. As shown in FIG. 7B, this pop-up menu 710 includes a "mark" option.

In response to selection of this "mark" option the Web browser plugin module identifies the anchor tags associated with the selected portion of the Web page and sends a request to the Web site server requesting that the selected portion be marked. As a result, the Web site server stores information in the data structures maintained by the present invention identifying the selected portion as being marked for special processing upon revisiting the Web page. The information stored in these data structures is then used in subsequent visits to the Web site to accentuate the portions marked during previous visits to the Web site.

Figure 8:
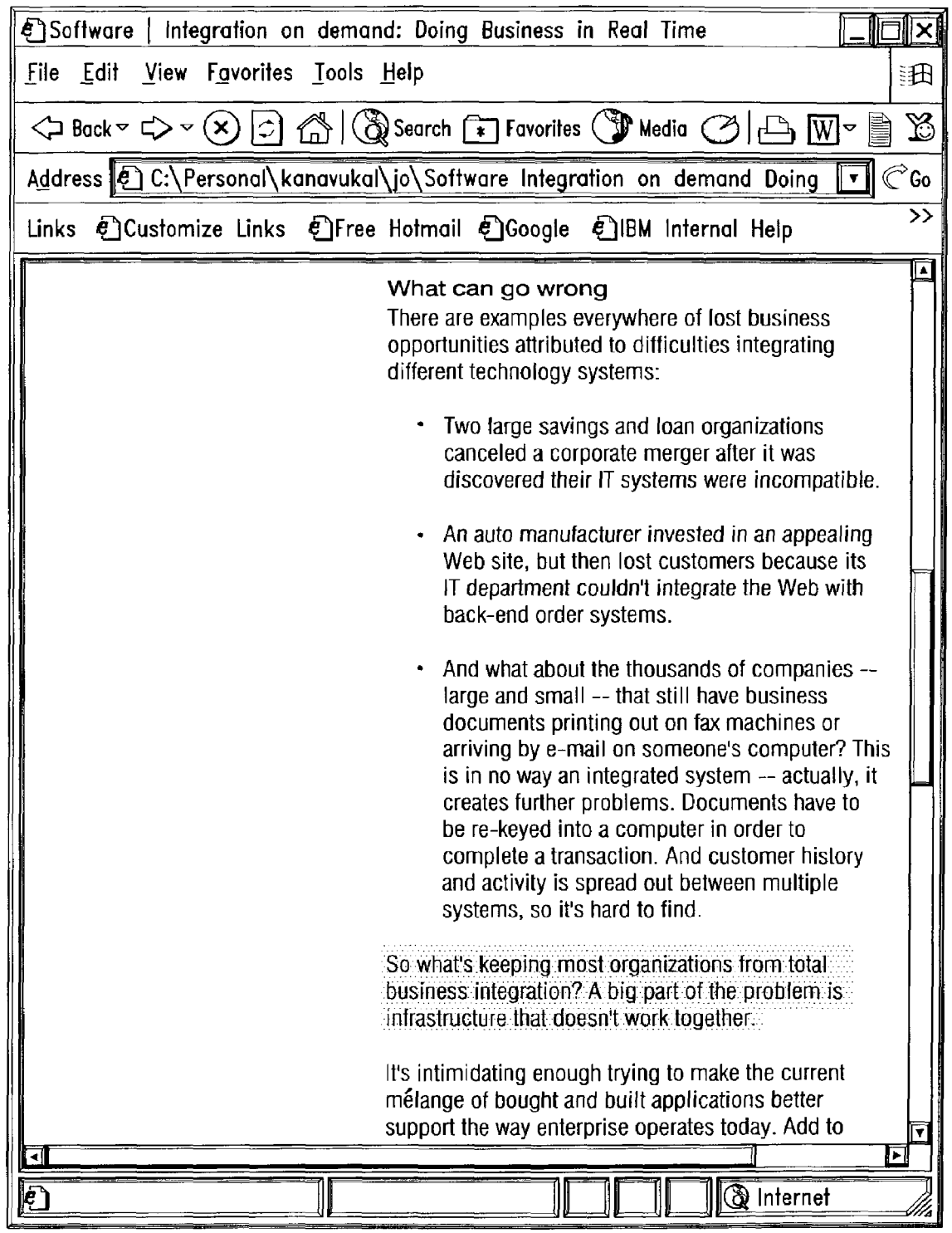
FIG. 8 is an exemplary diagram illustrating a graphical user interface of a Web browser in which a marked portion of a Web page is highlighted in accordance with the present invention.

FIG. 8 is an exemplary diagram illustrating a graphical user interface of a Web browser in which a marked portion of a Web page is highlighted in accordance with the present invention. As shown in FIG. 8, upon a subsequent visit to the Web site and a request for the same Web page marked in the process shown in FIGS. 7A-7B, the Web page is received by the web browser application of the client device. The Web page includes identifiers of the marked portion of the Web page. The plugin module to the Web browser application identifies the marked portions of the Web page and performs special processing on those portions. In the depicted example, the special processing involves highlighting the marked portion. Thus, the user's attention is immediately directed to the highlighted portion upon revisiting the Web page.

Figure 9:
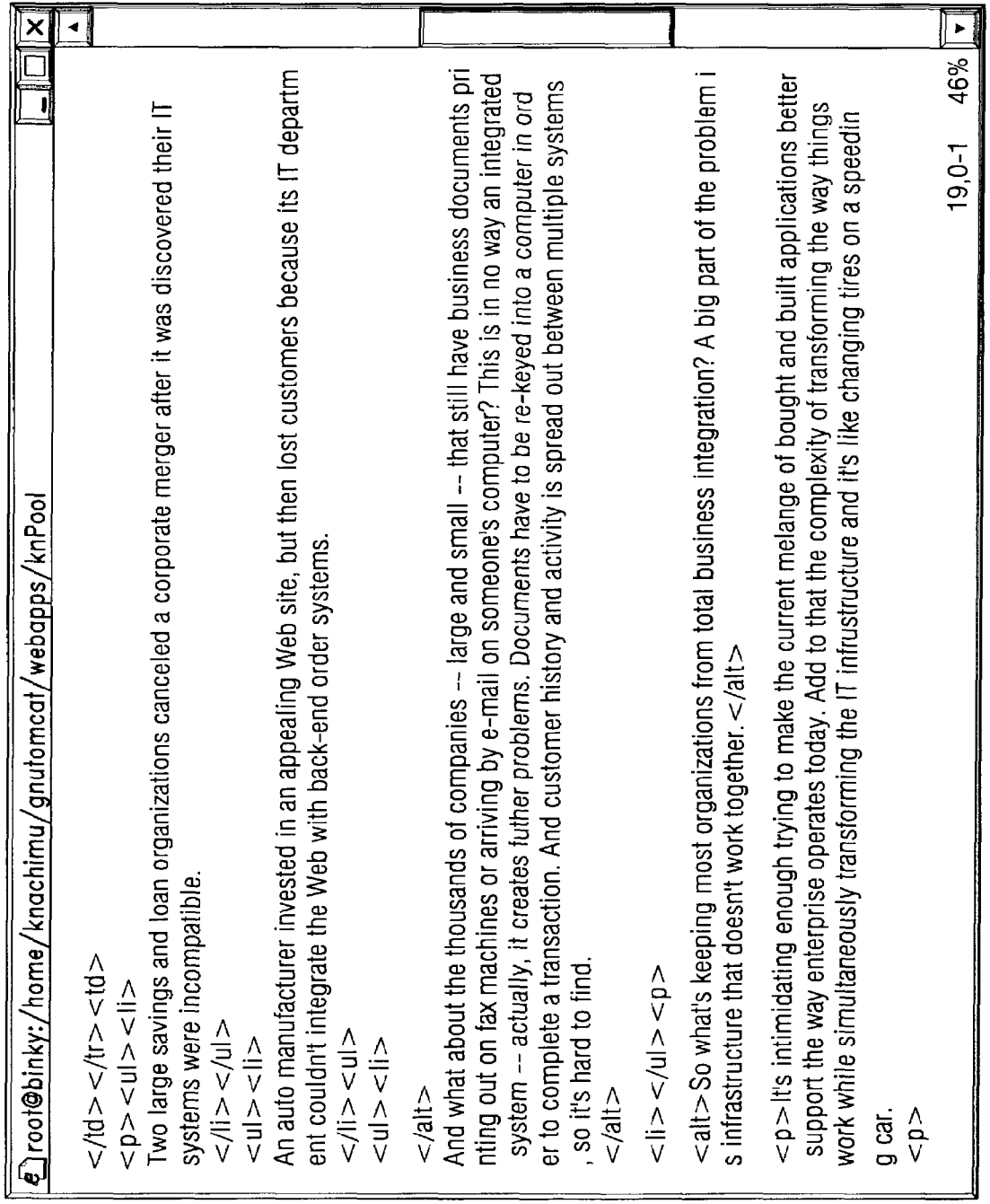
FIG. 9 is an exemplary diagram of code for the Web page of FIG. 8 illustrating the tags used to identify portions of the Web page in accordance with the present invention.

As mentioned above, in a preferred embodiment of the present invention, anchor tags are utilized to identify portions of a Web page. FIG. 9 is an exemplary diagram of code for the Web page of FIG. 8 illustrating the anchor tags used to identify portions of the Web page in accordance with a preferred embodiment of the present invention. As shown in FIG. 9, the code of the Web page includes anchor tags <alt> which are used to identify portions of the Web page. Although the <alt> tag is illustrated, any specific tag or custom tag may be used without departing from the spirit and scope of the present invention.

The <alt> tags may be enumerated in the Web page table data structure and may be identified by an anchor tag number. This anchor tag number indicates the particular <alt> tag from the top of the Web page code. The anchor tag number uniquely identifies the tag within the Web page code and thus, can be used by the plugin module to count the anchor tags in the Web page code from the top of the Web page code, until the identified number is encountered. Thus, the plugin module may parse the Web page code and keep a count of how many of the anchor tags are identified. When the count reaches, for example, "7", and the marked portion tag is anchor tag 7, the plugin module may identify the portion of the Web page code between the seventh <alt> tag and the </alt> tag as the portion of the Web page that was marked by the user.

In addition to marking of portions of a Web page, as discussed in the examples above, the present invention may include an option for "unmarking" or "undoing" a mark operation in the same or subsequent visit to a Web page. The unmark option may be provided in a similar manner as discussed above with regard to the marking option. That is, a user of a Web browser application on a client device may select a portion of a displayed Web page by clicking and dragging a pointer icon across the selected portion. A right click of the pointing device, for example, may then be used to access a pop-up menu that may have the "unmark" option enabled if the selected portion has been previously marked in the current or a previous visit to the Web page. By selecting the "unmark" option from the pop-up menu, a request is sent to the Web server to request that the selected portion be unmarked. As a result, the tags corresponding to the selected portion of the Web page are removed from the appropriate data structures indicating marked portions of the Web page.

Figure 10:
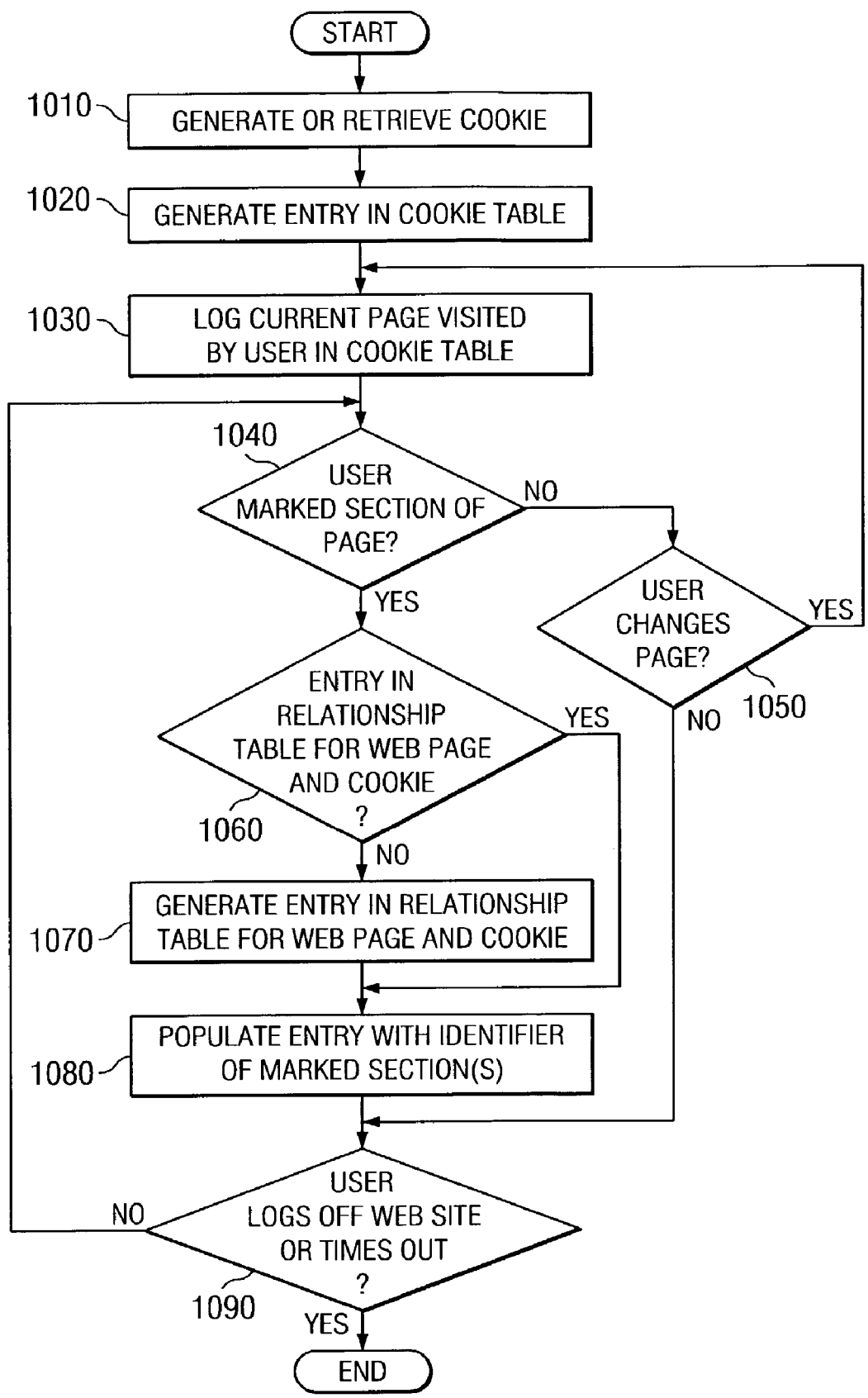
FIG. 10 is a flowchart outlining an exemplary operation of the present invention when marking portions of a Web page.
Figure 11:
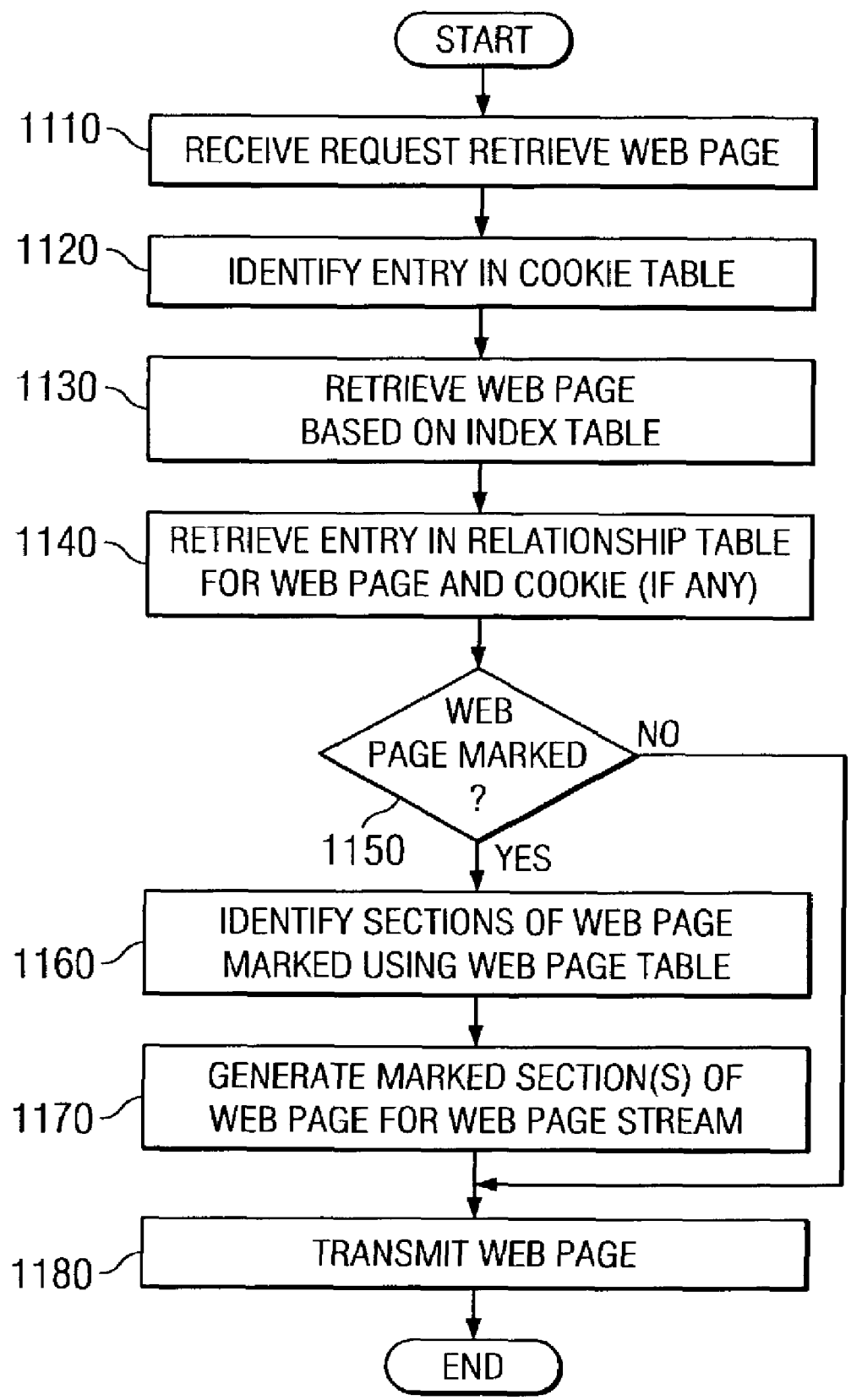
FIG. 11 is a flowchart outlining an exemplary operation of the present invention when identifying portions of a Web page that have been marked by a user in a previous visit to the Web page.

FIGS. 10-11 are flowcharts that illustrate an exemplary operation of a Web page marking mechanism according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 10 is a flowchart outlining an exemplary operation of the present invention when marking portions of a Web page. As shown in FIG. 10, the operation starts with the user logging onto the Web site server and a cookie being generated or retrieved for the client device (step 1010). An entry in the cookie table is generated (if not already present) (step 1020), and the current Web page is logged in the cookie table (step 1030).

A determination is then made as to whether the user has marked a section of the current Web page (step 1040). If not, a determination is made as to whether the user has changed to another Web page (step 1050). If the user has changed to another Web page, the operation returns to step 1030. Otherwise, if the user has not changed Web pages the operation goes to step 1090, discussed hereafter.

If the user has marked a portion of the Web page (step 1040), then a determination is made as to whether there is an entry in the relationship table for the Web page and the cookie (step 1060). If not, an entry is created (step 1070). Thereafter, or if an entry is already present in the relationship table, the entry is populated with the identifier of the marked portions of the Web page (step 1080). A determination is then made as to whether the user logs off the Web site or times out (step 1090). If not, the operation returns to step 1040; otherwise the operation ends.

FIG. 11 is a flowchart outlining an exemplary operation of the present invention when identifying portions of a Web page that have been marked by a user in a previous visit to the Web page. As shown in FIG. 11, the operation starts with a request being received to retrieve a Web page (step 1110). A corresponding entry in the cookie table is identified (step 1120) and the requested Web page is retrieved using the information in the Web site index table (step 1130).

An entry in the relationship table (if any) is retrieved that corresponds to the cookie and Web page requested (step 1140). A determination is made as to whether the Web page has marked portions (step 1150). If not, the Web page is transmitted in a normal fashion (step 1180). If the Web page has marked portions, the marked portions are identified using the Web page table (step 1160) and the code of the Web page is modified to identify the marked portions (step 1170). The Web page is then transmitted to the client device (step 1180) and the operation ends.

Thus, the present invention provides a mechanism for marking portions of a Web page for special processing during subsequent visits to that Web page by the same user or client device. In this way, a user may mark portions of a Web page that are of interest so that the user may easily revisit those specific portions later during the same or a different Internet session. The present invention reduces the amount of time required to look up information in Web pages that have already been visited.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for marking a portion of a Web page for special processing in a subsequent request for the Web page, comprising:
receiving a request, from a client device, to mark a portion of the Web page, wherein the request is received from an application associated with a Web browser application running on the client device, and wherein the portion is less than an entire Web page;
storing an identifier of the marked portion of the Web page in an entry of a data structure in association with a unique identifier of the client device, wherein the identifier of the marked portion of the Web page is retrievable from the data structure upon a subsequent request for the Web page from the client device based on the unique identifier of the client device; receiving a subsequent request for the Web page from the client device;
retrieving the entry in response to the subsequent request from the client device;
modifying code of the Web page to identify the marked portion as being marked prior to transmitting the code of the Web page to the client device; and
transmitting the modified code of the Web page to the client device, wherein the modified code of the Web page is received in the application associated with the Web browser application, wherein modifying code of the Web page to identify the marked portion as being marked prior to transmitting the code of the Web page to the client device includes modifying or adding header information in the code of the Web page identifying the marked portion of the Web page, wherein the application associated with the Web browser application performs special processing on the marked portion of the Web page, and wherein the special processing includes at least one of highlighting the marked portion, using a different text color with the marked portion, using a different text font with the marked portion, using a different text size with the marked portion, displaying only the marked portion using the Web browser application, using speech synthesis to read the marked portion, and providing an interface for jumping to the marked portion in response to user input via the interface.

2. The method of claim 1, wherein the identifier of the marked portion of the Web page includes at least one tag associated with the marked portion, the at least one tag being identified from code representing the Web page.

3. The method of claim 1, wherein the unique identifier of the client device is a cookie stored in association with the identifier of the marked portion of the Web page.

4. The method of claim 1, wherein the application provides a graphical user interface element selectable by a user for marking a portion of a Web page displayed by the Web browser application.

5. The method of claim 1, wherein the Web page is part of a Web site and wherein the Web site is defined in a Web page index table data structure having records for each Web page of the Web site, and each Web page of the Web site is defined in a Web page table data structure having records identifying tags that identify portions of associated Web pages.

6. The method of claim 1, wherein the request includes a cookie identifier associated with the client device, a Web page identifier for identifying the Web page, and one or more tag identifiers for identifying tags associated with the marked portion of the Web page.

7. The method of claim 5, wherein the cookie identifier, Web page identifier and the one or more tag identifiers are stored in a relationship table data structure record defining a relationship between the cookie identifier and marked portions of the Web page.

8. The method of claim 1, wherein the header information identifies one or more tags in the code of the Web page associated with the marked portion of the Web page.

* * * * *